United States Patent [19]

Laesser et al.

[11] 4,183,628
[45] Jan. 15, 1980

[54] ELECTRONIC WATCH AND DISPLAY DEVICE FOR SUCH WATCH

[75] Inventors: Claude Laesser, La Chaux-de-Fonds; René Viennet, Neuchatel; Eric Saurer, Bevaix, all of Switzerland

[73] Assignee: Ebauches S.A., Switzerland

[21] Appl. No.: 796,525

[22] Filed: May 13, 1977

[30] Foreign Application Priority Data

May 20, 1976 [CH] Switzerland ............... 6334/76
May 20, 1976 [CH] Switzerland ............... 6335/76

[51] Int. Cl.² ........................... G02F 1/13
[52] U.S. Cl. ................. 350/338; 58/50 R; 350/334; 350/339; 350/345
[58] Field of Search ............. 58/50 R; 350/338, 345, 350/334, 339

[56] References Cited

U.S. PATENT DOCUMENTS

| | | | |
|---|---|---|---|
| 3,630,015 | 12/1971 | Lehovec | 58/50 R |
| 3,823,551 | 7/1974 | Riehl | 58/23 BA X |
| 3,869,195 | 3/1975 | Aldrich et al. | 350/338 X |
| 4,042,294 | 8/1977 | Billings et al. | 350/345 |
| 4,095,217 | 6/1978 | Toni et al. | 350/332 |

OTHER PUBLICATIONS

Young: "Combination Reflective/Transmissive Liquid Crystal Display", *IBM Technical Disclosure Bulletin*, vol. 15, pp. 2435-2436, Jan. 1973.

*Primary Examiner*—Edward S. Bauer
*Attorney, Agent, or Firm*—Silverman, Cass & Singer, Ltd.

[57] ABSTRACT

An electro-optic display device having a partially transparent display cell and a semi-transparent mirror located behind said cell and arranged to transmit light waves within a first wave length band and to reflect light waves within a second wave length band. An electro-optic component is located behind the semi-transparent mirror and operates in a third wave length band which overlaps at least partially the first wave length band. The electro-optical component may be a plurality of photo cells used for recharging an accumulator for the display device and/or a light source transmitted across a light plate of frosted or clear glass to illuminate the display cell. The display cell is illuminated by either the reflected light waves or the light waves emitted from the light source.

4 Claims, 6 Drawing Figures

ELECTRONIC WATCH AND DISPLAY DEVICE FOR SUCH WATCH

BACKGROUND OF THE INVENTION

The present invention relates to the electronic watches having a passive display device and to the display devices of such watches.

One embodiment of the present invention consists in an electronic watch having at least one accumulator or battery, comprising photo-electric cells ensuring the reloading or recharging of this accumulator and an electro-optic passive display cell.

Watches of the above mentioned type are known in which, however, the display cell and the photo-electric cells for reloading the accumulator or accumulators are juxtaposed. That presents some drawbacks: as a matter of fact, these watches are not only not aesthetic, due to the unpleasant appearance of the photo-electric cells, but cannot comprise display cells having more than 3,5 digits, due to the cumbersomness unavoidably produced by having to situate both the display and the reloading cell on the front face of the watch since they must be either easy to be observed or to be able to be reached by the surrounding light.

SUMMARY OF THE INVENTION

One of the purposes of the present invention is to furnish a watch of the above mentioned type in which one does not find these drawbacks.

To this effect, the electronic watch according to the invention is characterized by the fact that its photo-electric cells are situated behind the display cell, with interposition of a half transparent mirror, so that at least the light rays the wave length of which is lower than those corresponding to the green color be reflected by the said half transparent mirror and, consequently, used for the reading of the information is displayed by the display cell, while at least a part of the light rays the wave length of which is higher than this one of the yellow passes through the half transparent mirror for acting on the photo-electric cells which produce then the reloading of the accumulator or accumulators.

Another embodiment of the present invention lies in a display device comprising an electro-optic passive display cell and a lighting device of this cell.

The night observation of the electro-optic passive display cells necessitates providing these cells with a lighting device. It has been ascertained that the efficiency of the lighting devices of such cells is increased by the use of a strong diffuser. Unfortunately, such diffusers decrease the day efficiency of the cell.

Another purpose of the present invention is to remedy to this drawback while furnishing a display device the light of which coming from the night lighting device be used almost entirely, without the day observation of the cell being affected.

This this effect, the display device according to the invention is characterized by the fact that it comprises a diffuser and a half transparent mirror arranged behind the cell, as well as a source of light, the half transparent mirror being arranged in such a way as to be transparent at least in a part of the band of the wave lengths of the light emitted by the said source, permitting thus the night reading, by transparence, of the display and to reflect the light for the rest of the light spectrum, permitting thus the day reading by reflection.

BRIEF DESCRIPTION OF THE DRAWINGS

The drawing shows, by way of example, several embodiments of the object of the invention.

DESCRIPTION OF THE PREFERRED EMBODIMENTS

Figure 1:
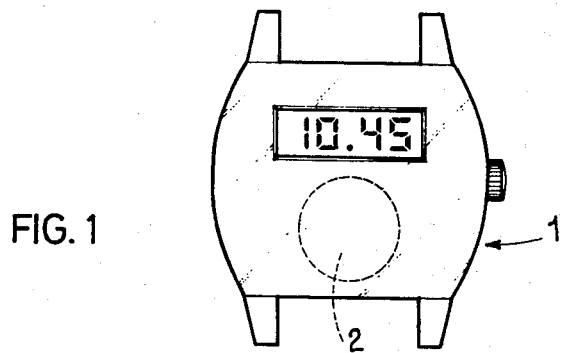
FIG. 1 is a plan view of an electronic watch the source of energy of which is constituted by a reloadable accumulator.

The watch represented in FIG. 1, generally designated by 1, is a digital display electronic watch. Its source of current is constituted by a reloadable or rechargeable accumulator or battery 2. The digital display device of this watch comprises one or the other of the display cells represented in FIGS. 2, 3 and 4.

Figure 2:
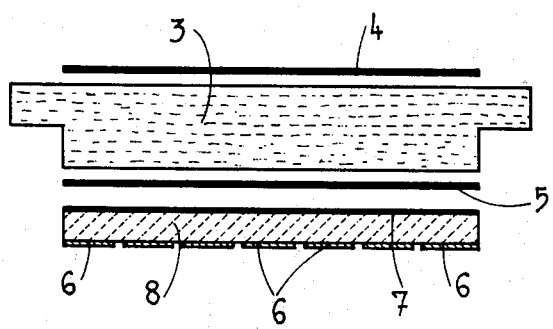
FIGS. 2, 3 and 4 are elevational views of three display devices provided with photo-electric cells intended to be used in the wrist-watch of FIG. 1, and FIGS. 5 and 6 are elevational views of two display devices comprising each a electro-optic passive display cell and a lighting device for illuminating this cell.

The display device represented in FIG. 2, comprises a liquid crystal cell 3 at the front and at the rear of which are located two polarizers 4 and 5, respectively, crossed with respect to each other, that is to say the directions of polarization of which are perpendicular to each other.

Photo-electric cells 6 are placed behind the polarizer 5, with interposition of a half transparent mirror, for instance a dielectric mirror 7. The cells 6 are secured on the front face of a frost glass plate 8 the front face of which carries the dielectric mirror 7.

Concerning, generally, the dielectric mirror, it is to be noted that it is constituted by a transparent substrate on which are deposited in vacuum a number of dielectric coatings have more or less high indicia of refraction. While choosing the material of these several coatings, as well as the thickness of each of them, it is possible to produce reflecting mirrors in practically any band of wave lengths, even while these mirrors will be considered as transparent for the other wave lengths, in the field of the visible light. Such mirrors can easily comprise more than ten coatings. Among the materials used are especially the ZnS, the $Na_3AlF_6$ and the PbTe.

It results from what has been stated previously that a portion of the luminous rays passing through the polarizer 4, the liquid crystals cell 3 and the polarizer 5, that it to say the rays the wave lengths of which is higher than those corresponding to the yellow color, that are to say the red and infra-red rays, pass through the dielectric mirror 7 and activates the photo-electric cells 6 which reload then the accumulator or accumulators of the watch. One will choose the dielectric mirror so that it is the light rays the wave lengths of which are higher than those corresponding to the yellow color which reach the photoelectric cells. So far as the rays the wawe length of which are lower or equal to those corresponding to the yellow color are concerned, they will be reflected by the dielectric mirror 7 the frost appearance of which, owing to the frost glass 8, operates as a diffuser, and are consequently used for the reading of the display.

It is to be noted that this splitting of the light is not unadvantageous neither for the reloading of the accumulator or accumulators nor for the reading of the display, due on the one hand to the fact that the photoelectric cells have their higher efficiency in tne red and in the infra-red and on the other hand to the fact that, so far as the display is concerned, the eye is not very sensitive to these two wave lengths.

It is still to be noted that the limit of transmission could be shifted towards the smaller waves lengths, which would increase the quantity of light reaching the photoelectric cells but would reduce the quantity of light used for the display. The limit will consequently be defined from case to case in function of the quality of the display as well as of the electric consumption of the watch.

It is also to be noted that, in the zone of the liquid crystals cells where an electric field is applied to the terminals of the liquid crystal, and light is retained by the polarizer 5, so that even in these particular zones where the light does not reach the dielectric mirror 7, it does represent only a weak percentage of the surface able to catch the light.

Figure 3:
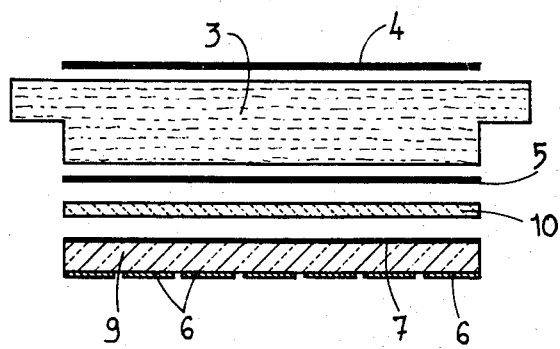

The display device of FIG. 3 distinguishes from this of FIG. 2 by the fact that the glass plate, designated by 9, situated behind the display cell 3, and which carries the photo-electric cells 6 and the dielectric mirror 7 has no frost face as in the first embodiment. The role of the diffuser is then taken by a frost glass plate 10, or of any other translucent material, interposed between the dielectric mirror 7 and the polarizer 5.

The photo-electric cells 6 ensure, as in the case of FIG. 2, the reloading of the accumulator 2 of the watch 1.

Figure 4:
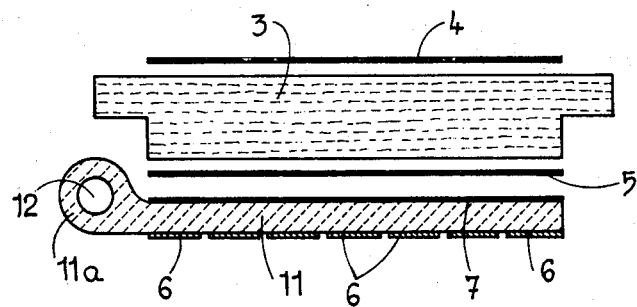

The display device of FIG. 4 distinguishes from this of FIG. 2 by the fact that the frost glass plate, designated by 11, situated behind the display cell 3 and which carries the photo-electric cells 6 and the dielectric mirror 7 is provided, laterally, with a thickened portion 11a in which is located a source of light 12. This source of light is arranged in such a way as to emit light rays of small wave length, that is to say of a wave length corresponding to the blue and to a portion of the green. So far as the dielectric mirror 7 is concerned, it is arranged in such a way as to reflect the light rays of great wave length, that is to say of a wave length corresponding to the red, to the yellow and to the rest of the green.

The photo-electric cells 6 ensure the reloading of the accumulator 2 of the watch 1. For the rest, the display device operates as follows:

The day light the wave length of which corresponds to the red, to the yellow and to a part of the green is reflected by the dielectric mirror 7, the rest of the spectrum serving to activate the photo-electric cells 6. During the night, on the contrary, the light emitted by the source of light 12 is diffused by the frost glass 11 and lights the cell.

The use of light rays of great wave length for the day observation and of rays of small wave length for the night observation is desirable as it is established that, physiologically, the eye is more sensitive, during the day, to an illumination in the great wave lengths than in the small ones while, during the night, it is the contrary which occurs.

In a display device provided with a rear lighting device, as this of FIG. 4 and of the following embodiments, owing to the characteristics of the dielectric mirrors stated previously, it is desirable to choose the dielectric mirror and use it as a function of the spectrum of emission of the chosen source of light. Thus, for instance, if the source of light is a source LED, the dielectric mirror will be chosen so that its band of transmission be narrow and corresponds to the band of emission of the source LED, which is quasi monochromatic. The rest of the light spectrum will be reflected in almost its totality. One will refer to the book of H.A. MACLEOD entitled "Thin-film optical filters", more particularly to FIGS. 7.2 (b), appearing in page 156 of this book, which furnishes an example of dielectric mirror which is particularly suitable in the case of a source of light lying in the green. This mirror effectively passes the green light while, for the other wave lengths it acts as a mirror.

According to the width of the spectrum of emission of the source of light, the transmission band of the mirror can be included in this spectrum of emission, in which case the whole light energy issued from the source will not be used during the night reading; the passing band of the mirror could on the contrary go beyond the said spectrum of emission, that will have for effect that the whole light energy will be used without, however, any drawback.

Figure 5:
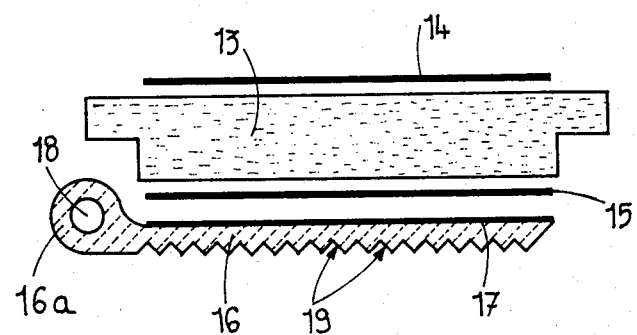

In the embodiment of FIG. 5, the electro-optic passive display cell with liquid crystals is designated by 13. It is provided, at the front and at the rear, with two polarizers 14 and 15, respectively, crossed with respect to each other, that is to say the directions of polarization of which are perpendicular with respect to each other.

A glass plate 16, playing the role of a light guide, is placed behind the polarizer 15. Its front face is frost, so that it operates as a diffuser and it carries a semi-transparent mirror 17, for instance a dielectric mirror constituted of coatings of dielectric material.

The plate 16 presents, laterally, a thickened portion 16a in which is located a source of light 18 arranged in such a way as to emit light rays of small wave length, that is to say of a wave length corresponding to the blue and to a portion of the green. So far as the dielectric mirror 17 is concerned, it is arranged in such a way as to reflect the light rays of great wave length, that is to say of a wave length corresponding to the red, to the yellow and to the rest of the green.

This display device operates as this one of FIG. 4. It is however to be noted that the rear face of the frost glass 16 is scratched at 19 so that the light emitted by the source 18 is directed towards the cell 13 through the dielectric mirror 17, the quasi totality of its light rays being thus used for lighting the cell.

Figure 6:
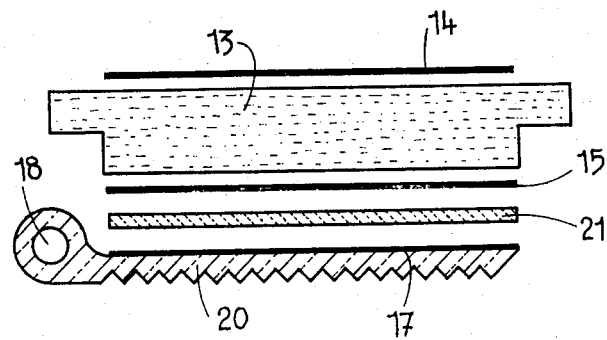

The embodiment of FIG. 6 distinguishes from the first one by the fact that the glass plate playing the role of light guide, designated by 20, and which carries the dielectric mirror 17, has no frost face as in the first embodiment. The role of diffuser is then played by a frost plate 21 made of glass or of any other translucent material, interposed between the dielectric mirror 17 and the polarizer 15.

In all the embodiments as disclosed and represented, the light guide could be made of any transparent material other than glass.

What we claim is:

1. A combination liquid crystal display and electrical generator comprising, a partially transparent liquid crystal display cell having front and rear surfaces for viewing from the front; a plurality of photoelectric cells located to the rear of said display cell and sensitive to light waves within a first frequency band corresponding to at least the color red; and a semi-transparent mirror located between said display cell and said photoelectric cells and adaped to transmit light waves within a second frequency band including wave lengths corresponding to at least the color red and reflect light waves within a third frequency band including wave lengths corresponding to at least the color blue, whereby the reflected light in the third frequency band corresponds to the band of light to which the human eye is most sensitive for maximizing the brightness of the display, and the transmitted light in the second frequency band corresponds to the band of light to which the photocells are most sensitive for maximizing the energy produced by the photoelectric cells.

2. The combination of claim 1, further comprising a frost glass located between said mirror and said photoelectric cells.

3. The combination of claim 1, further comprising a diffuser member located between said display cell and said mirror.

4. The combination of claim 1, wherein said semitransparent mirror is a dielectric mirror.

* * * * *